United States Patent [19]

Washizu

[11] Patent Number: 4,902,048
[45] Date of Patent: Feb. 20, 1990

[54] JOINT STRUCTURE FOR JOINTING METAL PIPES AT THEIR ENDS

[75] Inventor: Katsushi Washizu, Shizuoka, Japan

[73] Assignee: Usui Kokusai Sangyo Kaisha Ltd., Shizuoka, Japan

[21] Appl. No.: 172,692

[22] Filed: Mar. 24, 1988

[30] Foreign Application Priority Data

Mar. 31, 1987 [JP] Japan .............................. 62-47931[U]
Mar. 31, 1987 [JP] Japan .............................. 62-47932[U]

[51] Int. Cl.⁴ .............................................. F16L 17/04
[52] U.S. Cl. ................................ 285/319; 285/332.2; 285/382; 285/915
[58] Field of Search .................. 285/382.2, 382.1, 382, 285/256, 319, 915, 332.2

[56] References Cited

U.S. PATENT DOCUMENTS

| | | | |
|---|---|---|---|
| 139,841 | 6/1873 | Weston | 285/382 |
| 1,678,640 | 7/1928 | Hall | 285/256 X |
| 3,210,102 | 10/1965 | Joslin | 285/382.2 X |
| 3,826,523 | 7/1974 | Eschbaugh | 285/319 X |
| 4,541,655 | 9/1985 | Hunter | 285/382.2 X |
| 4,627,146 | 12/1986 | Ward | 285/382.1 X |
| 4,682,798 | 7/1987 | Sauer | 285/319 X |

FOREIGN PATENT DOCUMENTS 2906728  8/1979  Fed. Rep. of Germany ... 285/382.2

Primary Examiner—Randolph A. Reese
Assistant Examiner—J. Russell McBee
Attorney, Agent, or Firm—Anthony J. Casella; Gerald E. Hespos

[57] ABSTRACT

Herein disclosed is a joint structure for jointing the ends of two pipes to each other. One pipe has its one end portion formed with a plurality of slots arrayed circumferentially in its wall and with an inward projecting annular wall or a tapered annular wall positioned axially inside the slots to provide a receiving seat surface facing the other pipe. This other pipe is formed generally at its tip with a reduced annular wall providing a pushing seat surface and with at least one engagement groove positioned axially at the back of the reduced annular wall and extending in the circumference. These two pipes are jointed together by holding the inward projecting or tapered annular wall in abutment against the seat surface of the reduced annular wall, by fastening that one pipe at its portions of the slots in the engagement groove to reduce and deform it.

13 Claims, 4 Drawing Sheets

PRIOR ART

JOINT STRUCTURE FOR JOINTING METAL PIPES AT THEIR ENDS

BACKGROUND OF THE INVENTION

1. Field of the Invention

The present invention relates to improvements in the joint structure for joining together the ends of metal pipes which are arranged to supply oil or air to automobiles or other various machines, facilities and apparatus.

2. Description of the Prior Art

According to the joint structure of this kind of the prior art, as shown in FIG. 7, two pipes 11 and 14 are jointed at their ends to each other by fitting one end of the other pipe 14 in that one end portion of one pipe 11, which is formed with a plurality of slits 12 over its circumferential edge and with an annular groove 13 axially inside the slits 12, by clamping a sealing annular gasket 16 between the annular groove 13 and the corresponding outer circumference 15 of the pipe 14, and by fastening the portion of the pipe 11 having the slits 12 with a binding band 17.

However, the prior art joint structure frequently has its binding band 17 go out of position to slacken the bind, if it is in the vibrated state as arranged in the automotive engines or the machines, facilities or apparatus. After a long use, the joint structure has a tendency to induce a leakage as the sealing member has its function degraded. On the other hand, the use itself of the sealing member increases the production cost of the joint structure.

SUMMARY OF THE INVENTION

An object of the present invention is to provide a joint structure which is enabled to accomplish a tight joint by a simple operation of fastening a binding band to apply a strong facial pressure between the abutting seat surfaces of the joint, while eliminating the possible slackness or troubles of the binding band due to movement out of position even in the vibrated state and ensuring the joint and maintenance for a long period.

According to the present invention, there is provided a joint structure for jointing the ends of two pipes to each other. One pipe has its one end portion formed with a plurality of slots arrayed circumferentially in its wall and with an radially inward projecting annular wall or a tapered annular wall positioned axially such that the slots are intermediate the end of the pipe and the radially inward projecting annular wall or the tapered annular wall. Thus, the radially inward projecting annular wall or tapered annular wall. provide a receiving seat surface facing the other pipe. The other pipe is formed generally at its tip with a reduced annular wall providing a pushing seat surface and with at least one engagement groove positioned axially spaced from the reduced annular wall and extending in the circumference. These two pipes are jointed together by holding the inward projecting or tapered annular wall in abutment against the seat surface of the reduced annular wall, by fastening that one pipe at its portions of the slots in the engagement groove to reduce and deform it.

With the construction thus made, the two pipes are fitted one in the other near their end portions, and the portions of the slots of one pipe are fastened by the binding band or the like so that they are reduced and deformed to establish a tension. This tension tightly joints the two pipes at the receiving seat surface and the pushing seat surface.

DETAILED DESCRIPTION OF THE PREFERRED EMBODIMENTS

Figure 1:
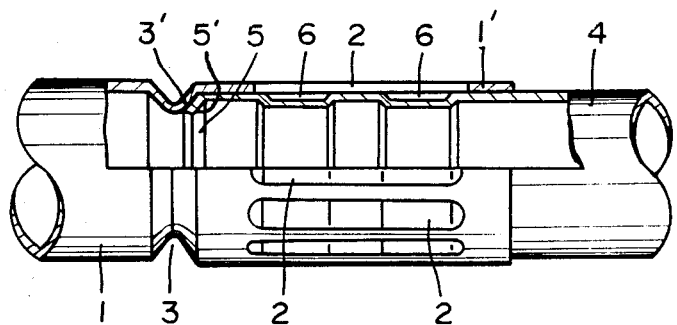
FIG. 1 is a partially cut-away section showing a joint structure of the end portions of the metal pipes, before it is fastened, according to one embodiment of the present invention.
Figure 2:
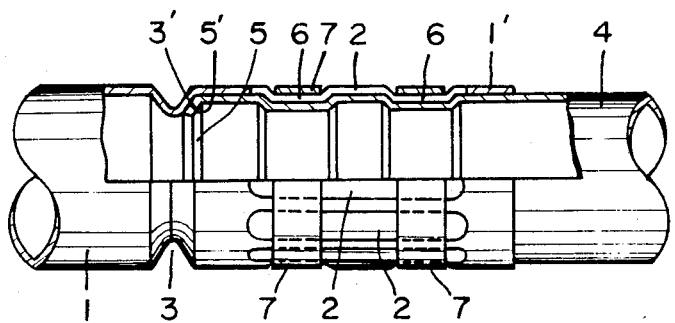
FIG. 2 is similar to FIG. 1 but shows the state after the joint structure has been fastened.

FIGS. 1 to 6 show individual embodiments of the present invention, in which identical or corresponding parts are designated at common reference numerals.

One pipe 1 has its one end portion formed with a plurality of slots 2 arrayed circumferentially in its wall 1' and with an inward projecting annular wall 3 having a V-shaped section and positioned axially such that the slots 2 are intermediate the end of the pipe 1 and the inward projecting annular wall to provide a receiving seat 3' surface facing the other pipe 4. This other pipe 4 is formed generally at its tip with a reduced annular wall 5 providing a pushing seat surface 5' and with at least one engagement groove 6 positioned in axially spaced relationship to the reduced annular wall 5 and extending in the circumference. The end portion of the pipe 4 is fitted in the joining and holding portion of the pipe 1 extending between the inward projecting annular wall 3 and the end of the pipe such that the receiving seat surface 3' and the pushing seat surface 5' abut against each other. Numeral 7 designates a binding band which is positioned around the engagement groove 6 of the pipe 4 for fastening the portions of the slots 2 of the pipe 1. The binding band 7 pulls the pipe 1, when fastened, in the axial direction to apply a facial pressure to the receiving and pushing seat surface 3' and 5' to tightly joint the two pipes 1 and 4.

Figure 3:
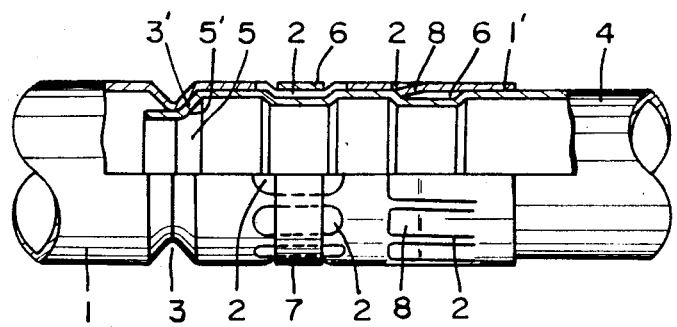
FIG. 3 is similar to FIG. 2 but shows another embodiment of the present invention.

Turning now to FIG. 3, numeral 8 designates a retaining pawl which is formed on the wall of the end portion of the pipe 1, in the case of one binding band 7, and directed radially inwardly from the slots 2 to project in the axial direction away from the end of the pipe 1. The retaining pawl 8 is bent to retain the engagement groove 6 so that the retaining pawl 8 may exhibit the binding function similar to that of the binding band 7.

Figure 2A:
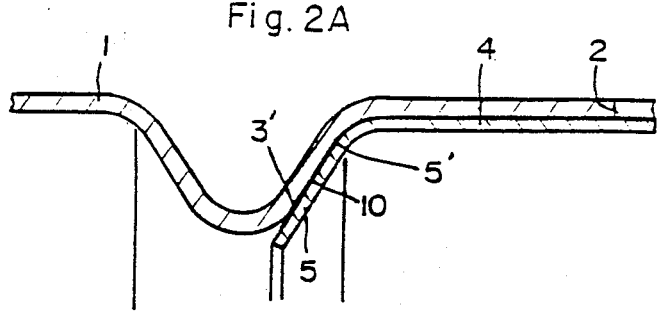
FIG. 2A and FIG. 2B are a partially enlarged view of other embodiments of the embodiment shown in FIG. 2, respectively.
Figure 2B:
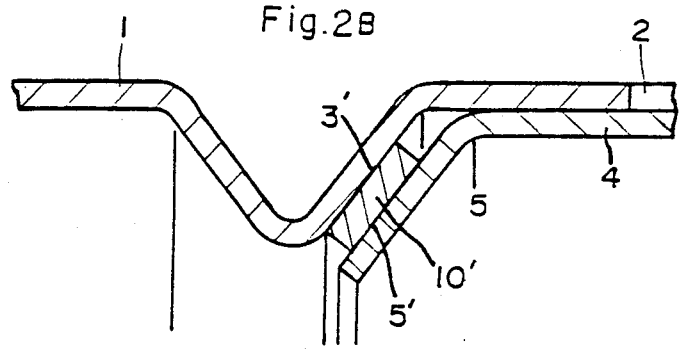
Figure 3A:
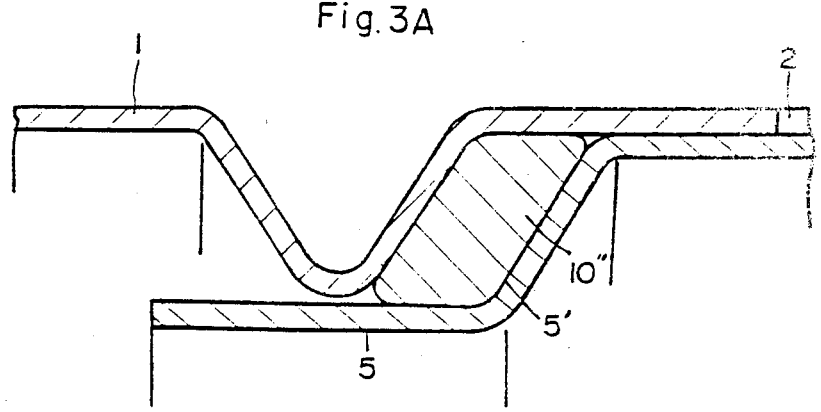
FIG. 3A is a partially enlarged view of still another embodiment of the embodiment shown in FIG. 3.

In the above-mentioned embodiments, in order to improve the sealability between the receiving seat surface 3' and the pushing seat surface 6' it is possible to provide a sealing agent 10 (FIG. 2A) between these two seat surfaces or interpose therebetween a resilient sealing member 10' (FIG. 2B) or O-ring 10'' (FIG. 3A).

Figure 4:
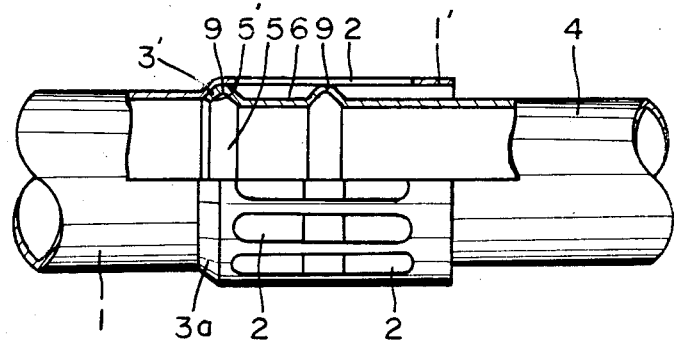
FIG. 4 is similar to FIG. 1 but shows still another embodiment of the present invention.
Figure 5:
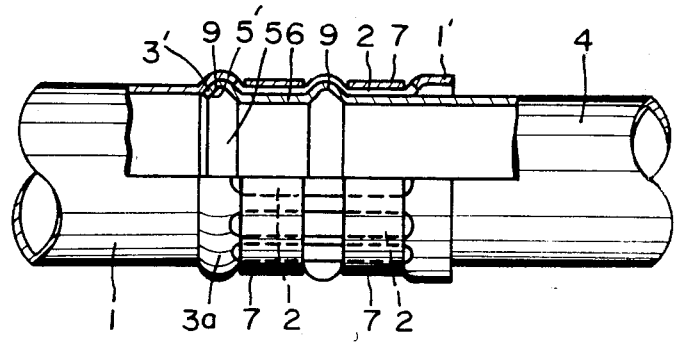
FIG. 5 is similar to FIG. 4 but shows the state after the joint structure has been fastened.
Figure 6:
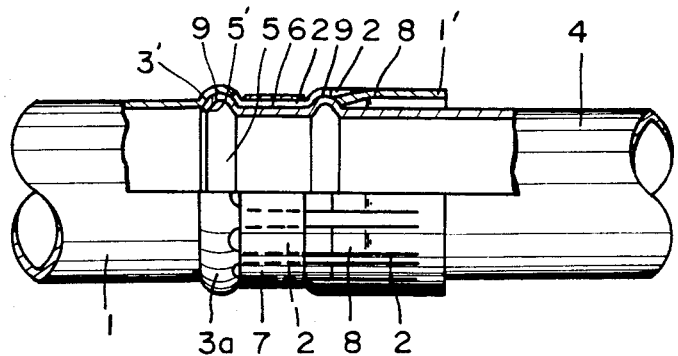
FIG. 6 is similar to FIG. 5 but shows a further embodiment of the present invention.
Figure 7:
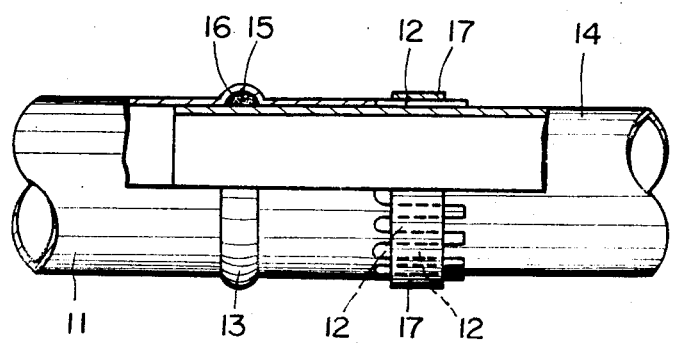
FIG. 7 is a partially cut-away section showing the joint structure according to the prior art.

In the other embodiments shown in FIGS. 4 to 6, one pipe 1 is expanded radially outwardly to form an annular wall 3a which is tapered outward to provide the receiving seat surface 3' at its front, such that the slots 2 are intermediate the end of the pipe 1 and the annular wall 3a. The other pipe 4 is bulged along the circumference to form a plurality of annular ridges 9 leaving the engagement grooves 6 between the ridges 9.

In the case of one binding band 7, as shown in FIG. 6, the retaining pawl 8 is also formed, like the embodiment of FIG. 3, on the wall of the end portion of the pipe 1 radially inwardly from the slots 2 and away from the end of the pipe 1. This retaining pawl 8 is bent to retain the facing one of the ridges 9 so that it may exhibit the binding function similar to that of the binding band 7.

Incidentally, it is quite natural that the binding and 7 of FIGS. 1 to 6 may be replaced by caulking means for radially caulking the pipe 1 from the outside.

In these embodiments it is also possible to provide the sealing means as shown in FIGS. 2A, 2B and 3A between the receiving seat surface 3' and the pushing seat surface 5' so as to improve the sealability between these seat surfaces.

In the joint structure for joining the ends of the metal pipes according to the present invention, as has been described hereinbefore, the portions of the slots 2 of the pipe 1 are reduced and deformed in the engagement grooves 6 of the pipe 4 by means of the binding band 7 so that a strong facial pressure is applied between the receiving and pushing seat surfaces 3' and 5' abutting against each other by the tension of the pipe 1 generated by the fastening action, thus tightly joining the two pipes 1 and 4. By this joint structure, the binding band 7 is prevented from being slackened or troubled due to the movement out of position even if the joint structure is arranged in a vibrated state so that the joint can be ensured and held reliably for a long period. By the simple fastening action with the binding band 7, moreover, the strong facial pressure can be applied between the abutting seat surfaces to ensure the tight joint. Thus, the present invention can provide a remarkably useful joint structure for joining the ends of two metal pipes.

I claim:

1. A joint structure for joining ends of first and second metal pipes, said first pipe having a first annular seating means spaced from the end thereof and defining a smaller cross section than said end, and a plurality of slots arrayed circumferentially in the wall of said first pipe intermediate the end thereof and the first annular seating means; the second pipe having second annular seating means formed generally at its end, the portion of said second pipe adjacent said end being disposed in the end of the first pipe such that the second seating means is abutting against said first seating means, at least one inwardly formed engagement groove formed in the circumferential wall of said second pipe axially spaced from said second seating means and in line with said slots, annular engagement means disposed in said second pipe, said first pipe further being formed with a retaining pawl projecting inwardly and axially away from the end of said first pipe to retain said annular engagement means of said second pipe, and fastening means for deforming the portions of said slots radially inwardly and into said engagement groove to securely join said pipes together, wherein said first pipe is axially pulled by the deformation caused by the fastening means to generate a facial pressure between said first and second seating means thereby to tightly join said pipes.

2. A joint structure according to claim 1, wherein said first seating means is an inward projecting annular wall whereas said second seating means is a reduced annular wall.

3. A joint structure according to claim 1, wherein said first seating means is a tapered annular wall whereas said second seating means is a reduced annular wall.

4. A joint structure according to claim 1, wherein the fastening means comprises a binding band.

5. A joint structure according to claim 1, wherein said engagement means is an annular engagement groove.

6. A joint structure according to claim 1, wherein said engagement means is an annular ridge.

7. A joint structure according to claim 1, wherein a sealing means is provided between said first seating means and said second seating means.

8. A joint structure according to claim 7, wherein said sealing means is a sealing agent.

9. A joint structure according to claim 7, wherein said sealing means is a resilient sealing member.

10. A joint structure according to claim 7, wherein said sealing means is a O-ring.

11. A joint structure for joining first and second metal pipes adjacent ends thereof, said first pipe having a first annular seating means spaced from the end thereof and defining a smaller cross section than said end, a plurality of slots arrayed circumferentially in the wall of said first pipe intermediate the end thereof and the first annular seating means and at least one inwardly extending pawl direct away from the end of the first pipe, the second pipe having a second annular seating means formed generally at its end, the portion of said second pipe adjacent the end being disposed within the end of the first pipe such that the second seating means is abutting against said first seating means, at least one inwardly formed engagement groove in the circumferential wall of said second pipe axially spaced from said second seating means and in line with the slots of said first pipe, said second pipe further defining an annular engagement means generally facing the end of the first pipe and engaged by the pawl of the first pipe, and fastening means for deforming the portions of said first pipe adjacent said slots radially inwardly and into said engagement groove of said second pipe to securely join said first and second pipes together.

12. A joint structure according to claim 11 wherein said engagement means of said second pipe is an annular engagement groove.

13. A joint structure according to claim 11 wherein said engagement means is an annular ridge.

* * * * *